Figure 1:
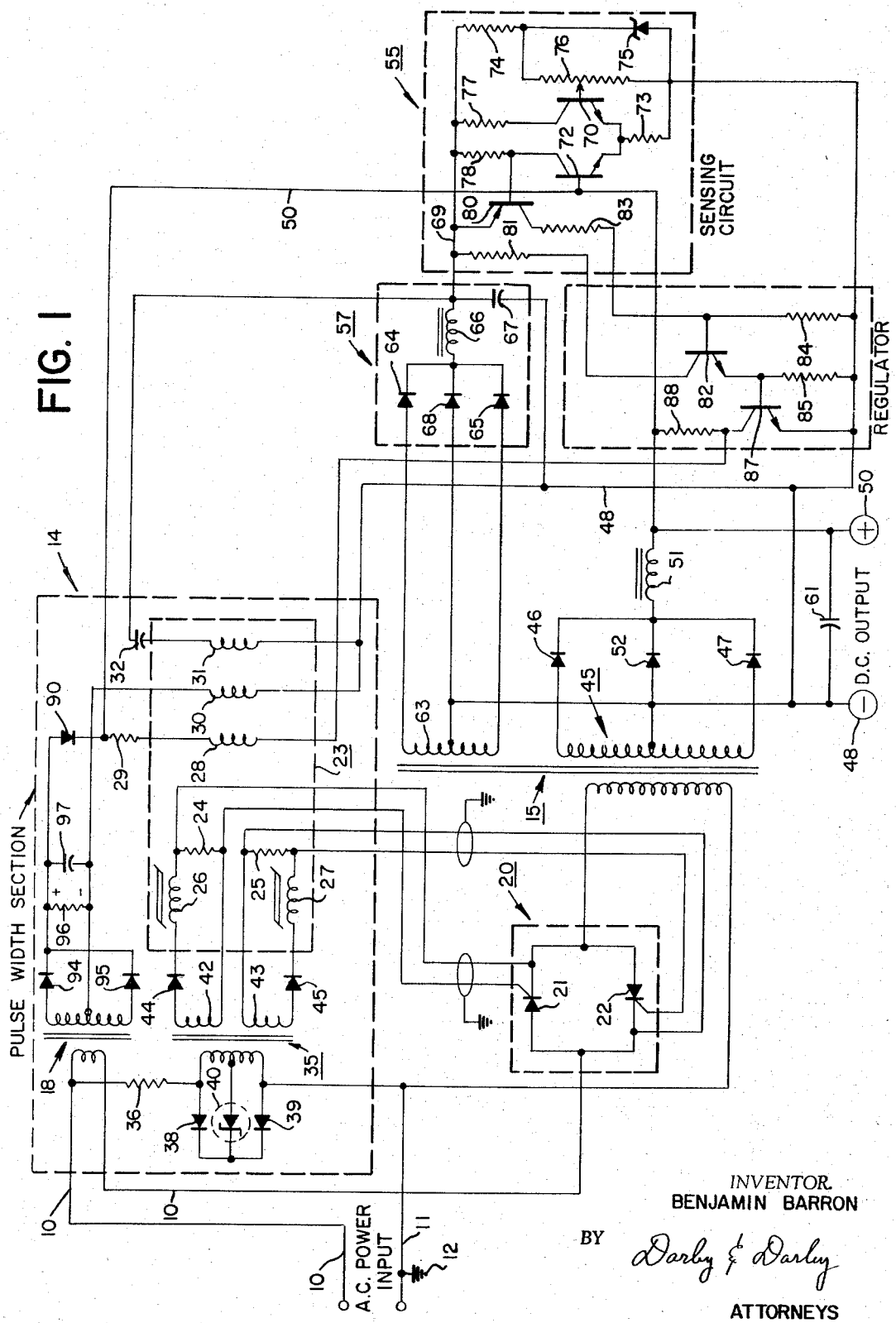

Dec. 5, 1967  B. BARRON  3,356,927
REGULATED POWER SUPPLY CIRCUIT
Filed June 11, 1964  2 Sheets-Sheet 1

INVENTOR.
BENJAMIN BARRON
BY Darby & Darby
ATTORNEYS

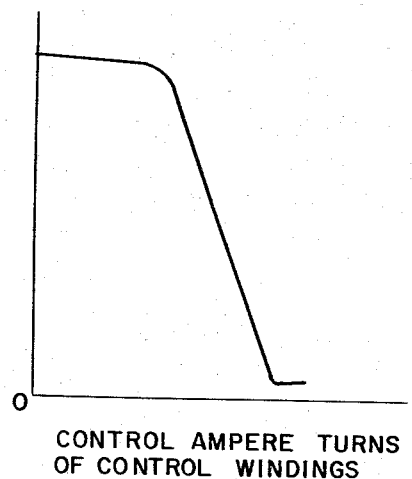
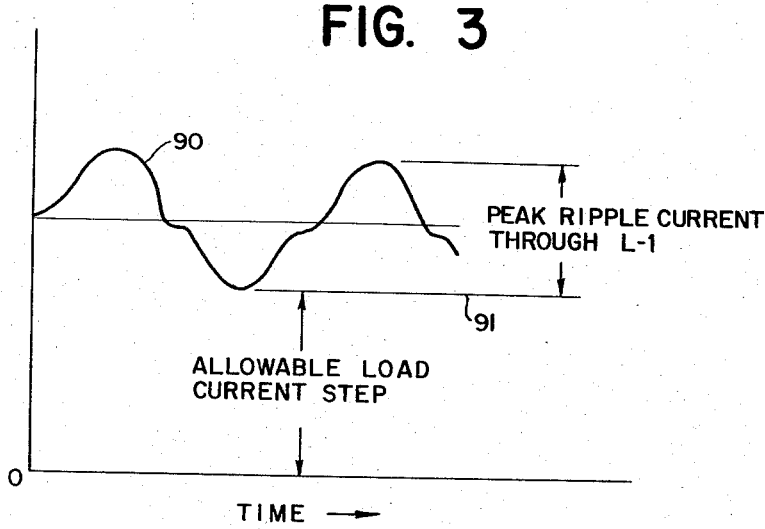

United States Patent Office 3,356,927
Patented Dec. 5, 1967

3,356,927
REGULATED POWER SUPPLY CIRCUIT
Benjamin Barron, Malba, N.Y., assignor to Lear Siegler, Inc., Long Island City, N.Y., a corporation of Delaware
Filed June 11, 1964, Ser. No. 374,422
6 Claims. (Cl. 321—18)

This invention relates to regulated power supply circuits and more particularly to a regulated power supply circuit for producing relatively low direct current (DC) voltages at relatively high currents.

The present invention is directed to a circuit for supplying a regulated DC output voltage of predetermined amplitude to a variable load. In accordance with the invention, alternating current from a source is rectified and applied to an energy storage device, such as an inductor, which supplies the voltage for the circuit output. The output voltage is regulated substantially instantaneously by the action of a shunt regulator device, such as a transistor, whose conduction is controlled by a voltage sensing circuit which compares the DC output voltage with the predetermined voltage to be produced. The sensing circuit causes the shunt regulator to conduct when the output voltage exceeds the predetermined voltage and shunt current away from the output thereby causing the output voltage to drop. At the same time, a slower acting regulation is made by controlling through a magnetic amplifier and silicon-controlled rectifier switch the average voltage from the source to be rectified and applied to the energy storage device. The latter regulation is controlled by the amount of current being shunted from the output so that the instantaneous and slow acting regulation actions are slaved together.

The regulator circuit of the present invention also has the capability of maintaining the output voltage for transient demands of the load and for shutting down the circuit when there is a sustained overload. The latter is accomplished by removing the source voltage from the rectifier and energy storage device.

Regulators made in accordance with the present invention are particularly useful in supplying high current demands of regulated, relatively low, DC output voltages. This is brought about in a preferred embodiment of the invention by using only an inductor as the energy storage device rather than the usual capacitor.

It is therefore an object of the present invention to provide a voltage regulator for producing a predetermined level DC output voltage in response to an alternating current input voltage.

Another object is to provide a DC voltage regulator operating from a source of AC voltage in which the DC output voltage is regulated by the simultaneous action of a device for shunting the output current to provide instantaneous regulation and a means for controlling the average voltage applied to the output of the regulator.

Another object is to provide a DC voltage regulator in which energy storage for the output is accomplished by an inductor and in which both the current into and out of the inductor are simultaneously controlled to provide regulation.

Other objects and advantages of the present invention will become more apparent upon reference to the following specification and annexed drawings in which:

FIGURE 1 is a schematic diagram of a regulator circuit made in accordance with the present invention;
FIGURE 2 is an illustration showing the average voltage present at the primary of the main power transformer of the circuit as a function of the control ampere turns of the magnetic amplifier; and
FIGURE 3 is a sketch of the current wave forms of the regulator transistor of the circuit of FIG. 1.

Referring to FIG. 1, the alternating current input to the direct current converter and regulator circuit of the present invention is applied from a suitable source (not shown) over supply lines 10 and 11. Supply line 11 is connected to a point of reference potential, such as ground 12, and directly to the lower end of the primary winding of a main power transformer 15. The upper end of the primary winding of transformer 15 is connected to supply line 10 through the primary winding of a current transformer 18 and a pair of oppositely poled silicon-controlled rectifiers (SCR) 21 and 22 in a switching control circuit 20.

The gate and cathode electrodes of silicon-controlled rectifiers 21 and 22 are respectively connected across output resistors 24 and 25 of first and second sections 26 and 27 of a conventional magnetic amplifier 23 located in the pulse width control portion 14 of the circuit. The two magnetic amplifier sections 26 and 27 have common control windings 28, 30 and 31 for simultaneously controlling their conduction.

Partially regulated alternating current input power for the magnetic amplifier sections 26 and 27 is provided by a transformer 35 whose primary winding is connected across the supply lines 10 and 11. The lower end of the primary winding of transformer 35 is connected directly to line 11, while the upper end is connected to line 10 through a resistor 36. The anodes of two diodes 38 and 39 are respectively connected to the upper and lower ends of the primary winding and the cathodes of the diodes are connected together. A zener reference voltage diode 40 is connected between the center tap of the primary and the diode cathodes.

Transformer 35 has two secondary windings 42 and 43 into which is induced the supply current for the magnetic amplifier sections 26 and 27. The upper end of secondary winding 42 is connected to the output winding of magnetic amplifier section 26 by a diode 44 and the lower end of secondary winding 43 is connected to the output winding of magnetic amplifier section 27 by a diode 45. Output resistors 24 and 25 are respectively connected between one end of the corresponding output winding and the free end of the corresponding secondary.

The diode system formed by diodes 38 and 39 and zener diode 40 in the primary winding of transformer 35 provides partially regulated square wave pulses on the secondaries 42 and 43 of the transformer. The zener diode 40 connected to the center tap of transformer 35 causes the transformer output to be substantially square since it will conduct at a fixed voltage level to limit the current in the primary. As can be seen, a positive voltage pulse is applied to diodes 44 and 45 connected to the secondary windings 42 and 43 each time the upper and lower ends of the primary of transformer 35 go negative respectively. The positive pulses make the corresponding diodes 44 or 45 conduct to supply current to the corresponding output winding of the magnetic amplifier sections 26 and 27.

When each of the magnetic amplifier sections 26 and 27 conducts an output pulse is produced across the corresponding output resistor 24 or 25. The conduction, or firing, of the magnetic amplifier sections is controlled by the current applied to the common control windings 28, 30 and 31. The current in windings 28 and 31 is used primarily to control the firing phase angle while the current in winding 30 is used to shut down the magnetic amplifier under certain conditions of abnormal circuit operation. The production of the current for the various control windings is described below in detail.

During the conduction times of the magnetic amplifier sections 26 and 27 the output voltage pulses produced across resistors 24 and 25 are applied to the corresponding gate and cathode electrodes of the silicon-controlled rectifiers 21 and 22 as a forward bias or gating signal. A forward bias supplied to the gate electrode of either silicon-controlled rectifier causes it to conduct. It should be noted that the secondary windings 42 and 43 of transformer 35 are phased to fire rectifier 21 when the positive half cycle of the AC input voltage is on line 10 and to fire rectifier 22 when the negative voltage is present. Thus, SCR switch 20 is operative on both half cycles of the input voltage for a time dependent upon the firing phase angle of magnetic amplifier sections 26 and 27.

Under normal circuit operating conditions, during each half-cycle of the alternating current input one or the other of silicon-controlled rectifiers 21 and 22 will be conducting in correspondence with the conduction of the respectively connected magnetic amplifier 26 or 27. The conducting rectifier will pass A.C. input voltage from the source to the upper end of the primary winding of transformer 15. It should again be pointed out that the conduction time of each silicon-controlled rectifier is determined by the phase angle of firing of the respectively connected magnetic amplifier section. By varying this firing angle, the average output of transformer 15 can be controlled since there will be more or less output current induced into the transformer secondary and be available to be integrated over a given period of time.

The portions of the half cycles of input current conducted through SCR switch 20 to the upper end of the primary winding of transformer 15 are induced into the lower secondary winding 45 of the transformer. A pair of diodes 46 and 47 having their anode electrodes respectively connected to the upper and lower ends of winding 45 form a full wave rectifier circuit. The center tap of winding 45 is returned to a point of reference potential, here illustrated by the negative terminal or output line 48 for the DC output voltage of the circuit. Output line 48 is shown isolated from ground 12, although it could be connected thereto. The positive output terminal or line is designated by the reference numeral 50.

The output of the diode rectifier circuit 46 and 47, which is a series of positive pulses, is applied to the input of an integrating inductor or choke 51 whose output is connected to the positive terminal 50 of the DC output. A free-wheeling diode 52 returns the input of the inductor 51 to the point of reference potential 48. Diode 52 provides a current return path for the input of the inductor during the times that the SCR switch 20 is off and no current is being induced into the secondary winding 45.

It should be noted that the DC output circuit 48, 50 does not use a storage capacitor as is common in most DC voltage output filter circuits. The purpose of the capacitor 61, which is connected across the DC output 48, 50, is to suppress high frequency oscillations.

The production of the regulated DC voltage of the desired value is achieved by the substantially instantaneous action of a shunt regulator 87 and by control of the firing angle of the magnetic amplifier sections 26 and 27 through changing the current in the control windings 28 and 31. The action of the shunt regulator 87 is directly in response to the pulsating current in the secondary winding 45 and is substantially instantaneous to reduce the output current and thereby the output voltage to the desired predetermined level. Control of magnetic amplifier sections 26 and 27 varies the conduction time of the SCR switch 20 and the average voltage available to inductor 51. This is a relatively coarse and long term adjustment of the output voltage as compared to the fine and fast acting adjustment provided by regulator 87. Both of these actions are controlled by a sensing circuit 55 whose operation is described in greater detail below.

The predetermined magnitude output voltage level for the circuit is established by a zener diode 75 which is the primary voltage reference for the circuit. The supply voltage for the zener diode and for the sensing circuit 55 is produced by a DC voltage supply circuit 57. Circuit 57 includes a second secondary winding 63 of transformer 15 having a full-wave rectifier formed by diodes 64 and 65 connected to its upper and lower terminals. The center tap of winding 63 is returned to the point of reference potential on line 48 by a free-wheeling diode 68 which serves the same function as free-wheeling diode 52. The output of diodes 64 and 65 is connected to a one section choke input filter formed by a choke 66 and a capacitor 67. The bottom end of capacitor 67 is returned to the point of reference potential.

A positive D.C. voltage is produced at the junction of choke 66 and capacitor 67 and on line 69. This voltage is used to bias the base electrode of a first (NPN) transistor 70 through a resistor 74 and potentiometer 76 and to establish the circuit reference voltage. Transistor 70 is one-half of a differential amplifier including a second (NPN) transistor 72. Both transistors 70 and 72 have a common emitter resistor 73 returned to the reference point 48 while their collector electrodes are connected to the supply voltage line 69 by resistors 77 and 78. The lower end of base bias resistor 74 is returned to the reference potential point 48 through the primary reference voltage zener diode 75 and the voltage at the junction of resistor 74 and diode 75 is stable, in accordance with the operating characteristics of the zener diode. A portion of this stable voltage is tapped off across adjustable potentiometer 76 and applied to the base of transistor 70 to set the conduction level for the differential amplifier, i.e., the desired D.C. output voltage level. It should be noted that the regulated D.C. output voltage is adjustable by means of potentiometer 76.

The base of transistor 72 is connected directly to the positive terminal 50 of the D.C. output. Thus, the conduction of the differential amplifier is controlled by the difference between the portion of the reference voltage of diode 75 applied to the base of transistor 70 and the positive D.C. output voltage on line 50. When the voltage at the base of transistor 72 exceeds the desired D.C. output voltage, transistor 72 conducts and produces a voltage drop at its collector resistor 77. The voltage drop is applied directly to the base of a (PNP) transistor 80 connected in common emitter configuration and causes this transistor to conduct more heavily. Increased conduction of transistor 80 produces a rise in the voltage at its collector which is applied through a resistor 83 to the base of an (NPN) transistor 82 connected in emitter follower configuration. The base of transistor 82 is returned to the point of reference potential 48 by a resistor 84 while its collector is connected to voltage supply line 69 by resistor 81. An emitter resistor 85 returns the emitter to the reference potential point.

The output of transistor 82 taken across emitter resistor 85 is applied directly to the base of the shunt regulator transistor 87 which preferably has a power handling capacity sufficiently high for proper circuit operation. The emitter of transistor 87 is returned directly to the reference potential line 48, while the collector is returned to the positive side 50 of the D.C. output through a resistor 88. Conduction of emitter follower transistor 82 also causes the regulator transistor 87 to conduct. Since transistor 87 is directly across the D.C. output, its collector current increases and shunts current from the D.C. output. This causes the D.C. output voltage to drop.

Since the integrating inductor 51 tries to force a constant current into the output, and a portion of this constant current is drawn away by conduction of the shunt regulator transistor 87, the output voltage across terminals 49 and 50 must fall. Thus, every time the output voltage at terminal 50 rises above the reference level for the system set by zener diode 75, transistor 87 is placed into conduction by the sensing circuit 55 to draw off current from the output and thus cause the output voltage to fall. As can be seen, this is regulation of the output voltage when it goes above the predetermined output level.

The speed of response of the system to achieve voltage regulation by the action of transistor 87 is limited only by the inherent speed of response of the transistors in the system. As is known, transistors are relatively fast-acting and, therefore, regulation by shunt transistor 87 is essentially instantaneous. The regulation action by transistor 87 is made much faster than the cycle to cycle time of the main power frequency. The latter is usually in the 60–400 c.p.s. range and seldom goes above several thousand cycles per second while the transistor reaction time can be in the nanosecond range and lower. Thus, the essentially instantaneous action of reducing the output voltage by the action of transistor 87 causes the output voltage at terminals 49 and 50 to rise and fall in a correspondingly rapid manner. This rapid action also suppresses the ripple in the output voltage.

As pointed out before, no storage capacitors are needed for production of the D.C. output voltage since energy storage is provided by the inductor 51. Energy storage in oscillation suppression capacitor 61 has negligible effect on the output of the system.

The value of the integrating inductor 51 is not infinite. Thus, the current limiting action time is limited by the integrating time constant of the inductor. In a practical system, this time constant is made approximately $1/f$, where $f$ is the frequency of the alternating current supply. Therefore, if the output voltage is controlled solely by the action of the shunt transistor 87, then the current stored by the inductor would increase substantially without limit as time increased.

To take care of this problem, the circuit also provides an automatic adjustment of the average current applied to inductor 51, through the pulse width control section 14. To do this the pulse width of the voltage induced into the secondary winding 45 of transformer 15 is controlled by the action of magnetic amplifier sections 26 and 27 and the silicon-controlled rectifiers 21 and 22. This provides correction for relatively long term effects. This automatic adjustment is combined with the action of the regulator transistor 87 to provide steady state voltage regulation. The pulse width control action is described below.

As shown in FIGURE 2, the average voltage on the primary of transformer 15 falls as the control ampere turns of current to the magnetic amplifier sections 26 and 27 is increased. This occurs since as the control current to the control windings, such as winding 28, is increased, then the firing phase angle of the magnetic amplifier is increased resulting in a smaller conduction cycle or less "on" time for SCR switch 20. When there is no control current applied to the control windings 28, 29 and 31, the firing angle of the magnetic amplifier is essentially 0° and the SCR switch 20 is on all the time resulting in a full cycle of the alternating current input voltage being passed to the transformer 15. As the firing angle of the magnetic amplifiers is increased, resulting in less "on time" for SCR switch 20, the average voltage across the primary of transformer 15 decreases.

The value of the shunt current drawn by transistor 87 appears as a voltage drop across its collector resistor 88. Magnetic amplifier control winding 28 is connected across resistor 88, with the lower terminal of the control winding being connected directly to the collector of transistor 87 and the upper terminal being connected through a resistor 29 to the upper end of resistor 88. Control winding 28 is so phased that with increasing voltage across current detecting resistor 88, which results from an output voltage in excess of the predetermined voltage or a decrease in the load, then the firing angle of the magnetic amplifier 23 is increased. This means that there will be less average voltage at the primary of transformer 15 and less current to be integrated by the inductor 51. This produces a lower DC output voltage across terminals 49 and 50 which is the desired regulating action for the stated condition of increased shunt current through transistor 87.

If the output voltage at terminals 48, 50 drops below the predetermined value, which may be caused by an increase in the load for example, then no current is drawn through transistor 87 and there is no drop across resistor 88. This condition causes the current through control winding 28 to decrease which results in a decrease in the firing angle of magnetic amplifier 23 and an increase in the average voltage across the primary of transformer 15. This results in an increase in the current applied to inductor 51 and in the output voltage.

In operation, if the output voltage requires regulation in a manner that calls for increased current in the shunt transistor 87, i.e., the output voltage is above the predetermined level, the feedback system including control winding 28, starts to pull the average primary voltage of transformer 15 down. Since there is little direct current voltage drop across integrating inductor 51, the DC output voltage across terminals 49 and 50 also falls.

As can be seen, the transistorized regulating section 55 formed by the differential sensing amplifier 70–72 and the shunt regulator 87, has a dual function. It first provides essentially instantaneous response for transient and ripple suppression of the output DC voltage by varying the conduction of the shunt transistor 87. At the same time, due to sensing of the shunt current drawn through transistor 87, precision error voltage sensing is provided which controls the action of magnetic amplifier 23 and SCR switch 20 to provide a steady state regulation at the primary of transformer 15. Stated another way, the coarse steady state regulating action of the SCR switch 20 is slaved to the instantaneous action of the shunt regulating transistor 87 through the collector resistor 88.

The system also has the capability of providing for transient demands of current. To do this, the control current through winding 28 is normally biased by resistor 29 and transistor 87 also is biased so that the quiescent operating current through transistor 87 includes the maximum shunted ripple current supplied from inductor 51 riding on the predetermined allowable step in load current demand for the system. This is shown in FIGURE 3, where the ripple type current through the inductor is shown by the waveform 90. This waveform varies above the maximum allowable step in load current shown by line 91.

When transistor 87 is biased as described above, if the demand of the load is suddenly increased, the voltage across terminals 49 and 50 will fall only slightly since the energy storage function of an inductor 51 will tend to force the increased current demanded into the load. This will cause a reduction in the current shunted by transistor 87 via the feedback control circuit through the instantaneous action of circuit 55. However, if the current suddenly demanded exceeds the level of current stored in the inductor, then there will be a dip in the output voltage until the silicon-controlled rectifier switch 20 recovers to increase the voltage at the primary of transformer 15 and the output voltage of the system.

Dynamic stabilization and rapid recovery of the magnetic amplifier, silicon-controlled rectifier system is provided by the magnetic amplifier control winding 31, which reacts to instantaneous changes in the output voltage of transformer 15. Winding 31 has its upper end connected to the voltage at the junction of choke 66 and capacitor 67 by a capacitor 33. The lower end of winding 31 is returned to the reference potential point 48. The current through control winding 31 is "leading" in the sense that it is phase advanced with respect to the voltage at the junction point. Winding 31 is phased with respect to amplifier 23 so that its current acts oppositely to instantaneous voltage changes at the junction point, i.e., an increase in the voltage at the junction point results in an instantaneous increase in the firing angle of amplifier 23 and a drop in the voltage at the primary of transformer 15 and vice versa. Steady state voltage changes at the junction point, which occur over a relatively long period of time, have no effect due to the presence of capacitor 32.

The system also has an arrangement for protection for sustained overloads. To do this, the current in one side of the alternating current voltage supply line 10 is detected by the primary of the current-sensing transformer 18. This current is converted into a voltage across a resistor 96 by a full wave rectifier formed by diodes 94 and 95 connected to the ends of the secondary winding of transformer 18. A capacitor 97 is connected across resistor 96 to integrate the input AC voltage to a waveform which approximates that of the input current. Thus, the voltage at the upper end of resistor 96 is a measure of the input current, which in turn is proportional to the output or load current.

The lower end of resistor 96 is connected to the upper end of the control winding 30 and the lower end of this control winding is connected to the point of reference potential 48. A diode is connected between the upper end of resistor 96 and the positive terminal 50 of the DC output.

When the input voltage proportionate to the load current detected across resistor 96 exceeds the ouput voltage at terminal 50, which would indicate that the input current is too high and that the circuit is operating abnormally, then diode 90 is forward biased and a current flows through control winding 30. This winding is so phased that the control current will tend to shut down the magnetic amplifier, i.e., increase its firing angle or prevent it from firing altogether. When a short circuit occurs at the output terminals the load current and voltage across resistor 96 will be much higher than the output voltage. In this case the magnetic amplifier is shut down immediately and no voltage is applied to transformer 15.

As long as the circuit is operating under normal load conditions the output voltage exceeds the voltage across resistor 96 so that diode 90 will be back-biased and no current will flow through winding 30. In any case, the circuit will resume normal operation after the fault causing a circuit overload is removed.

The overall efficiency of the system of FIG. 1 is determined primarily by the allowed step of load current set by the quiescent bias of transistor 87. This efficiency is given by the expression:

$$N = \frac{N_o}{1 + \frac{\Delta I_L}{I_{LMAX}}}$$

Where:

$N$ = system efficiency
$N_o$ = basic conversion efficiency of the rectifying system
$\Delta I_L$ = maximum step of load current
$I_{LMAX}$ = rated maximum load current of the system It should be noted that the efficiency is not dependent on the input AC voltage or the load. Thus, good efficiency is achieved over wide variations of power inputs.

While preferred embodiments of the invention have been described above, it will be understood that these are illustrative only, and the invention is limited solely by the appended claims.

What is claimed is:

1. Apparatus operating from a source of alternating current for producing a regulated direct current output voltage of a predetermined magnitude comprising:
   means for converting the alternating current into direct current,
   an inductor electrically coupled to said converting means for storing the direct current,
   output means electrically coupled to said inductor on which said regulated direct current voltage is produced,
   relatively fast acting first regulating circuit means electrically coupled to said output means comprising:
   (a) means for establishing a signal corresponding to the predetermined magnitude of the output voltage,
   (b) means for sensing the magnitude of the voltage at said output means,
   (c) means for comparing the signal corresponding to the predetermined magnitude output voltage and the voltage sensed at the output means and producing a control signal when the latter exceeds the former,
   (d) means electrically coupled to the output means and responsive to the control signal for shunting current from the output means to decrease the output voltage,
      a silicon-controlled rectifier switching means having a variable conduction time connected between the alternating current source and the converting means,
      relatively slow acting second circuit means for controlling the conduction time of the switching means comprising:
         magnetic amplifier means electrically coupled to the control means of said switching means for controlling the conduction time of the switching means in accordance with the conduction of said magnetic amplifier means,
         and first control winding means receiving coupled to the control means of said the current passing through said current shunting means for controlling the conduction time of the magnetic amplifier means thereby controlling the average voltage applied to the inductor from the voltage converting means.

2. Apparatus as set forth in claim 1 and further comprising means for detecting rapidly occurring changes in accordance with the demand in current at said output means and producing a signal corresponding thereto whose phase leads that of the output voltage, and second control winding means responsive to the signal produced by said detecting means for controlling the operation of said magnetic amplifier and said switching means in a manner to supply the current demand.

3. Apparatus operating from a source of alternating current for producing a regulated direct current output voltage of a predetermined magnitude comprising:
   means for converting the alternating current into direct current,
   an inductor electrically coupled to said converting means for storing the direct current,
   output means electrically coupled to said inductor on which said regulated direct current voltage is produced,
   regulating circuit means electrically coupled to said output means comprising:
   (a) means for establishing a signal corresponding to the predetermined magnitude of the output voltage,
   (b) means for sensing the magnitude of the voltage at said output means,
   (c) means for comparing the signal corresponding to the predetermined magnitude output voltage and the voltage sensed at the output means and producing a control signal when the latter exceeds the former,
   (d) means electrically coupled to the output means and responsive to the control signal for shunting current from the output means to decrease the output voltage,
   (e) a silicon-controlled rectifier switching means having a variable conduction time connected between the alternating current source and the converting means,
   (f) magnetic amplifier means electrically coupled to said switching means for controlling the conduction time of the switching means in accordance with the conduction of said magnetic amplifier means, (g) first control winding means receiving at least a portion of the current passing through said current shunting means for controlling the conduction time of the magnetic amplifier means thereby controlling the average voltage applied to the inductor from the voltage converting means, (h) means for comparing a voltage corresponding to the input alternating current to the converting means and the voltage of said output means, (i) and second control winding means for said magnetic amplifier means responsive to a condition where the voltage corresponding to the input current to the converting means exceeds the output voltage for operating said magnetic amplifier means in a manner to reduce the conduction time of the switching means and thereby decrease the average current applied to said converting means.

4. Apparatus as set forth in claim 3 wherein said regulating circuit means further comprises:

(j) means for detecting rapidly occurring changes in accordance with the demand in current at said output means and producing a signal corresponding thereto whose phase leads that of the output voltage, (k) and third control winding means responsive to the signal produced by said detecting means for controlling the operation of said magnetic amplifier and said switching means in a manner to supply the current demand.

5. Apparatus operating from a source of alternating current for producing a regulated direct current output voltage of a predetermined magnitude comprising: means for connection to the alternating current source for converting the alternating current into direct current at the apparatus output, said converting means including a current responsive means, variable duty cycle switching means connected between the alternating current source and said converting means for applying alternating current to said converting means, reference means connected to the apparatus output for sensing the magnitude of the direct current output voltage and producing a control signal when the output voltage exceeds a reference voltage level corresponding to said predetermined magnitude output voltage, means connected to the output of said converting means and substantially instantaneously responsive to the production of said control signal for shunting a portion of the direct current from the apparatus output to lower the output voltage toward said predetermined magnitude, magnetic amplifier means connected to said current responsive means of said converting means and to said current shunting means and having a first control winding receiving at least a portion of the current passed by said shunting means, means electrically connecting said current responsive means to said switching means to control the duty cycle thereof thereby varying the direct current produced at the apparatus output on a basis which is slower in reaction time than the operation of said shunting means to effect long term changes in the output voltage, and means for comparing the input alternating current to the converting means and the magnitude of the output voltage and producing a control signal in response to an abnormal operating condition, and control means responsive to said control signal for controlling the operation of said magnetic amplifier to reduce the amount of alternating current supplied to said converting means.

6. Apparatus operating from a source of alternating current for producing a regulated direct current output voltage of a predetermined magnitude comprising:

means for converting the alternating current into direct current, means electrically coupled to said converting means for storing the direct current, output means electrically coupled to said storing means, relatively fast acting first regulating circuit means electrically coupled to said output means comprising:

(a) means for establishing a signal corresponding to the predetermined magnitude of the output voltage, (b) means for sensing the magnitude of the voltage at said output means, (c) means for comparing the signal corresponding to the predetermined magnitude output voltage and the voltage sensed at the output means and producing a control signal when the latter exceeds the former, (d) means electrically coupled to the output means and responsive to the control signal for shunting current from the output means to decrease the output voltage, a controlled rectifier switching means having a variable conduction time connected between the alternating current source and the converting means, relatively slow acting second regulator circuit means in a control circuit comprising:

magnetic amplifier means electrically coupled to said switching means for controlling the conduction time of the switching means in accordance with the conduction of said magnetic amplifier means, and first control winding means receiving at least a portion of the current passing through said current shunting means for controlling the conduction time of the magnetic amplifier means thereby controlling the average voltage applied to the inductor from the voltage converting means.

References Cited

UNITED STATES PATENTS

| | | | |
|---|---|---|---|
| 3,230,437 | 1/1966 | Cappello | 323—22 |
| 3,218,540 | 11/1965 | Jackson | 321—18 |
| 3,193,725 | 7/1965 | Skirpan | 323—89 |
| 3,199,015 | 8/1965 | Lackey et al. | 321—19 |
| 3,087,107 | 4/1963 | Hunter et al. | 321—19 |
| 3,009,093 | 11/1961 | Seike | 323—22 |
| 3,270,270 | 8/1966 | Yenisey | 321—25 |
| 3,270,269 | 8/1966 | Low | 321—18 |

JOHN F. COUCH, Primary Examiner.

M. L. WACHTELL, Assistant Examiner.

UNITED STATES PATENT OFFICE
CERTIFICATE OF CORRECTION

Patent No. 3,356,927                  December 5, 1967

Benjamin Barron

It is hereby certified that error appears in the above numbered patent requiring correction and that the said Letters Patent should read as corrected below.

Column 8, line 28, strike out "coupled to the control means of said" and insert instead -- at least a portion of --.

Signed and sealed this 18th day of March 1969.

SEAL)

Attest:

Edward M. Fletcher, Jr.               EDWARD J. BRENNER

Attesting Officer                      Commissioner of Patents